US006868718B1

(12) United States Patent
Hui et al.

(10) Patent No.: US 6,868,718 B1
(45) Date of Patent: Mar. 22, 2005

(54) WIRELESS TIRE PRESSURE ALARMING SYSTEM AS DIRECTLY POWERED FROM CAR CIGARETTE-LIGHTER RECEPTACLE

(76) Inventors: David Hui, 10-1 Fl., No. 223, Nanking East Road, Sec. 5, Taipei (TW); Wen-Feng Huang, 131, Yung-Ta 5th Road, Yung-Kang City, Tainan Hsien (TW)

( * ) Notice: Subject to any disclaimer, the term of this patent is extended or adjusted under 35 U.S.C. 154(b) by 0 days.

(21) Appl. No.: 10/715,290

(22) Filed: Nov. 14, 2003

(51) Int. Cl.$^7$ ............................................. G01M 17/02
(52) U.S. Cl. ...................... 73/146; 73/146.2; 73/146.5; 73/78; 24/137; 116/34; 340/384.1; 340/442
(58) Field of Search ............................. 73/146–146.5, 73/78; 152/415; 116/34; 24/137; 340/384.1, 340/442

(56) References Cited

U.S. PATENT DOCUMENTS 4,220,907 A * 9/1980 Pappas et al. .................. 322/3
4,319,220 A * 3/1982 Pappas et al. ............... 340/447
4,943,798 A * 7/1990 Wayne ......................... 340/443
6,571,481 B1 * 6/2003 Weiss ........................... 33/203
6,705,360 B1 * 3/2004 Bonzer ......................... 141/38

* cited by examiner

Primary Examiner—Edward Lefkowitz
Assistant Examiner—Alandra Ellington

(57) ABSTRACT

A wireless tire pressure alarming system includes a tire pressure sensor & transmitter attached to each car wheel for sensing the tire pressure in each car wheel and for remotely sending the tire pressure signal from each car wheel; and a receiver having a plug plugged in a car cigarette-lighter receptacle to be powered by the car battery through such a cigarette-lighter receptacle and for receiving the tire pressure signal from the car wheel; whereby upon detection of a tire pressure reduced below the pre-determined safety pressure value of each car wheel, an alarm will be actuated either by an optical alarm signal or a sound alarm signal for warning the car driver for inflating his or her car wheel for enhancing driving safety.

3 Claims, 3 Drawing Sheets

WIRELESS TIRE PRESSURE ALARMING SYSTEM AS DIRECTLY POWERED FROM CAR CIGARETTE-LIGHTER RECEPTACLE

BACKGROUND OF THE INVENTION

A conventional wireless tire pressure monitoring system includes a valve pressure sensor & transmitter for sensing tire pressure from each car wheel and remotely transmitting the tire-pressure signal; and a receiver for receiving the tire-pressure signal sent from the tire pressure sensor & transmitter for monitoring the tire pressure in each car wheel for enhancing car driving safety.

If the receiver is powered by (at least) a dry cell which is independently separated from the original car power-supply (battery) system, the used cell should be always be replaced with new one, thereby causing inconvenience for the power supply of the wireless tire pressure monitoring system.

If the receiver is electrically connected to the battery originally provided in the car, an electric wiring system should be additionally implemented in order to supply power source from the car battery to the tire pressure monitoring system, also causing inconvenience for those cars intended to be further equipped with such a wireless tire pressure monitoring system.

The present inventor has found the drawbacks of the conventional wireless tire pressure monitoring system, and invented the present tire pressure alarming system by directly supplying power to the alarming system from the car cigarette-lighter receptacle.

SUMMARY OF THE INVENTION

The object of the present invention is to provide a wireless tire pressure alarming system including a tire pressure sensor & transmitter attached to each car wheel for sensing the tire pressure in each car wheel and for remotely sending the tire pressure signal from each car wheel; and a receiver having a plug plugged in a car cigarette-lighter receptacle to be powered by the car battery through such a cigarette-lighter receptacle and for receiving the tire pressure signal from the car wheel; whereby upon detection of a low tire pressure below the pre-determined safety pressure value of each car wheel, an alarm will be actuated either by an optical alarm signal or a sound alarm signal for warning the car driver for inflating his or her car wheel for enhancing driving safety.

DETAILED DESCRIPTION

Figure 1:
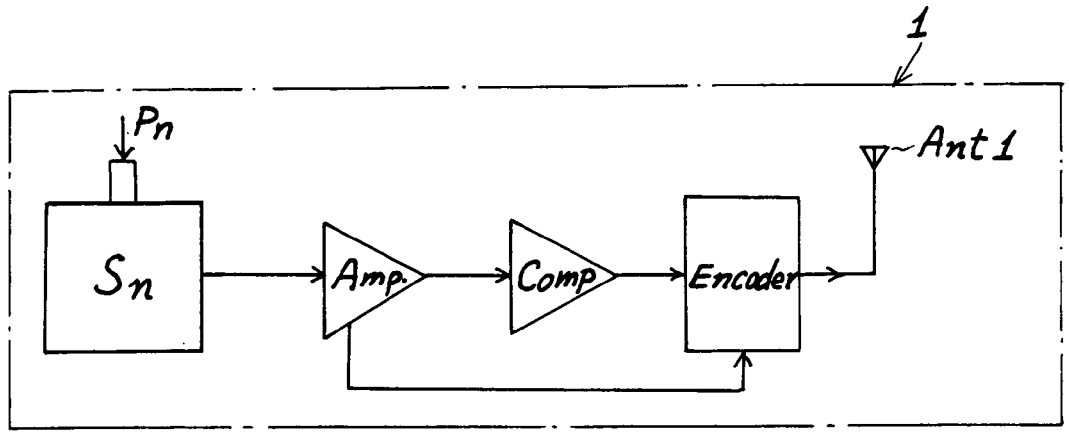
FIG. 1 is a block diagram showing each tire pressure sensor & transmitter of the present invention.

As shown in the drawing figures, the present invention comprises: a plurality of (or four) tire pressure transmitters 1 each attached to each car wheel for sensing the tire pressure signal in each car wheel and for remotely transmitting the tire pressure signal; and a tire pressure receiver 2 plugged in the car cigarette-lighter receptacle R as originally provided in the car on or adjacent the dash board B in the car to be powered by the battery as originally installed in the car.

As shown in FIG. 1, each tire pressure transmitter 1 includes: a sensor Sn (such as $S_1$, $S_2$, $S_3$ and $S_4$ corresponding to the front-left car wheel, the front-right wheel, the rear-left wheel and the rear-right wheel respectively) attached to each car wheel (especially connected to each valve of each wheel tire) for sensing the tire-pressure signal Pn of each car wheel (tire) such as $P_1$, $P_2$, $P_3$ and $P_4$ respectively corresponding to the tire pressure in the four wheels; an amplifier (Amp) for amplifying the tire-pressure signal Pn as sensed from each sensor Sn; a comparator (Comp) for comparing the tire-pressure signal as fed from the amplifier with a safety pressure value pre-determined and recorded in the comparator; an encoder for receiving a low tire pressure signal from the comparator with the low pressure being less than the pre-determined safety value when compared in the comparator and operatively encoding an identification code signal by the encoder; and a transmitting antenna Ant 1 remotely transmitting the identification code signal.

The transmitter 1 is a conventional art and will not be described in detail in this specification. The transmitter 1 can be directly powered by a battery stored in the transmitter and having a duration of 10 years. Therefore, there is no problem to supply power to the transmitter 1 at all.

Figure 2:
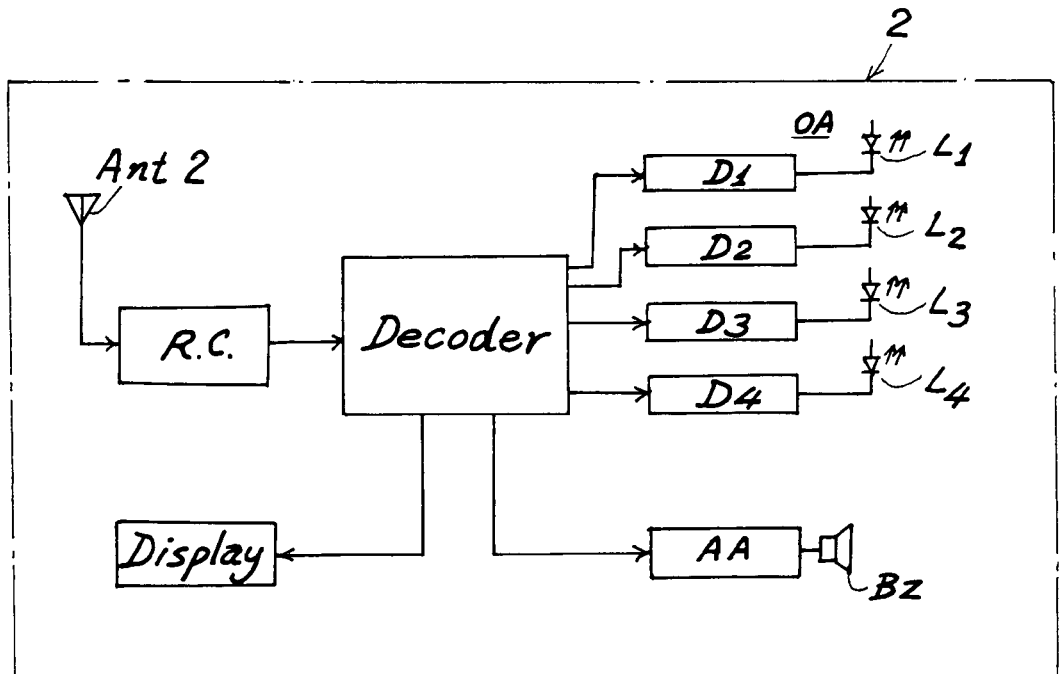
FIG. 2 is a block diagram showing the tire pressure receiver of the present invention.
Figure 3:
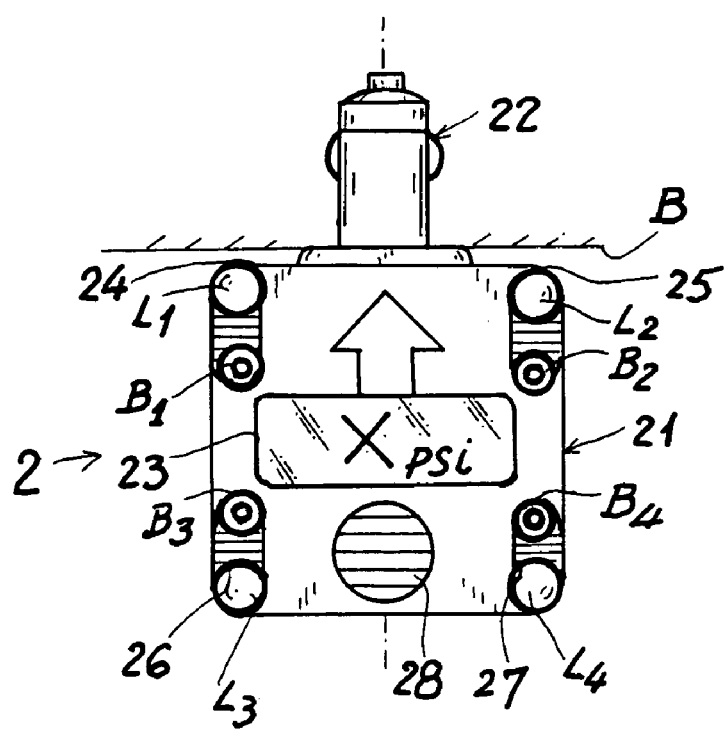
FIG. 3 is a top view of the receiver of the present invention.

As shown in FIGS. 2 and 3, the receiver 2 of the present invention includes: a receiving circuit RC having a receiving antenna Ant 2 for receiving the identification code signal as transmitted from the transmitter 1; a decoder for decoding the identification code signal to learn the specific identification code as preset in each transmitter corresponding to the specific car wheel to which said transmitter is attached; a plurality of (or four) visual or optical alarms (OA) connected with the decoder each alarm (OA) consisting of a light-emitting diode LED ($L_1$~$L_4$) and a LED driver ($D_1$~$D_4$) and each corresponding to a specific location of the car wheel on the car, whereby upon lighting up of one said LED, it will give warning for a low pressure caused in the corresponding car wheel (tire); an audio alarm (AA) connected to the decoder having a buzzer (Bz) for sounding an alarm corresponding to the car wheel causing low tire pressure; and a display (preferably a LCD display) connected to the decoder for the display of pressure data of the car wheel with low pressure.

Figure 4:
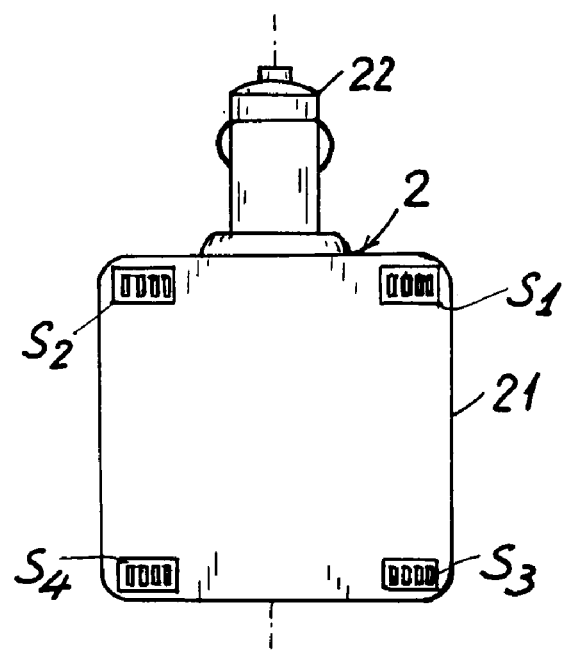
FIG. 4 is a bottom view of the receiver.
Figure 5:
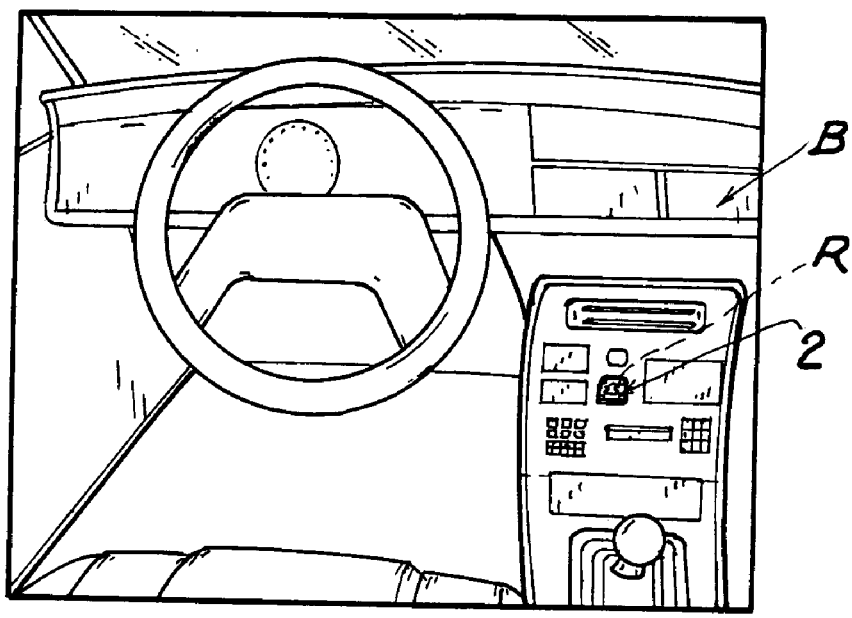
FIG. 5 shows the application of this invention.

The electric circuit of the receiver 2 as shown in FIG. 2 may be installed in the receiver device as shown in FIGS. 3~5.

The receiver 2 as shown in FIG. 3 includes: a receiver body 21 which may be formed as a shape of four-wheel sedan; a plug 22 protruding forwardly from the receiver body 21 and operatively plugged in the car cigarette-lighter receptacle R (FIG. 5) when removing the cigarette lighter from the receptacle R for connecting power supply from a car battery (not shown) through the receptacle; a display 23 such as a LCD display formed on a top surface of the receiver body 21 for showing the pressure data of the car wheel (tire); a plurality of (or four) LEDs such as $L_1$, $L_2$, $L_3$ and $L_4$ respectively disposed on a front left portion 24, a front right portion 25, a rear left portion 26 and a rear right portion 27 corresponding to the four wheels respectively disposed on the four portions 24~27 of the car for optically warning the car wheel of low-pressure; and a buzzer 28 formed on the receiver body 21 for sounding the audio alarm for warning the low-pressure car wheel.

When a car wheel (tire), for example, the rear right wheel, has leaked to reduce its tire pressure below a pre-determined safety value, the transmitter 1 corresponding to the rear right wheel will sense a low pressure signal and transmit an identification code signal corresponding to the rear right wheel remotely.

The receiver 2, after receiving such an identification code signal, will decode and learn the correct code as preset in the rear right wheel to actuate the LED driver $D_2$ to light up $L_2$ (the LED corresponding to the rear right wheel), thereby giving a warning optical signal for the rear right wheel which is now showing a low pressure. Meanwhile, the buzzer 28 will also be sounding to give an audio signal for such a low-pressure wheel.

Each corner portion 24~27 may be respectively formed with a button $B_1$~$B_4$ respectively to be corresponding to the four car wheels. Upon depressing of the specific button (such as $B_4$), the tire pressure (such as X psi) will be clearly shown on the display 23.

Besides, the upper pressure value for the four wheels may also be given by the other warning system (not shown) either by visual alarm or audio alarm, in accordance with the present invention, in order for warning a high-pressure or excess pressure danger in the car wheel (tire) to prevent from tire explosion for enhancing driving safety, which may be modified by those skilled in the art.

As shown in FIG. 4, the receiver 2 may be provided with four selectors $S_1$~$S_4$ corresponding to the four wheels, namely, the front left wheel, the front right wheel, the rear left wheel and the rear right wheel respectively. Each selector may be pre-set with the specific identification code corresponding to the specific car wheel for precisely coinciding the code of the receiver plugged in the receptacle R in the car with the code of the transmitter as attached on the specific car wheel (tire).

The figure as shown in FIG. 3 will simulate a car driving forwardly in an arrow direction as illustrated and having the four wheels disposed on the four corner portions of the car.

Therefore, the abnormal tire pressure as existing in a specific car wheel will be correspondingly indicated on the receiver 2 just plugged in the receptacle R on the dash board for an easy convenient monitoring and alarming purpose, thereby efficiently enhancing a car driving safety.

Without worry about the power supply problem, just plugging the receiver 2 into the receptacle of the car, the present invention can thus be conveniently equipped and used, regardless of a new or an old car and no matter what the car model or design is.

Accordingly, the present invention provides a compact, convenient and ready-for-use wireless tire pressure alarm device to be superior to any conventional wireless tire pressure monitoring systems.

The transmitters and receiver are not limited to the examples as given in this specification.

The present invention may be further modified without departing from the spirit and scope of the present invention.

The safety pre-determined tire pressure value can be adjusted by providing an adjusting device (not shown) in the electronic circuit of the present invention, which are so conventional in the art.

Figure 6:
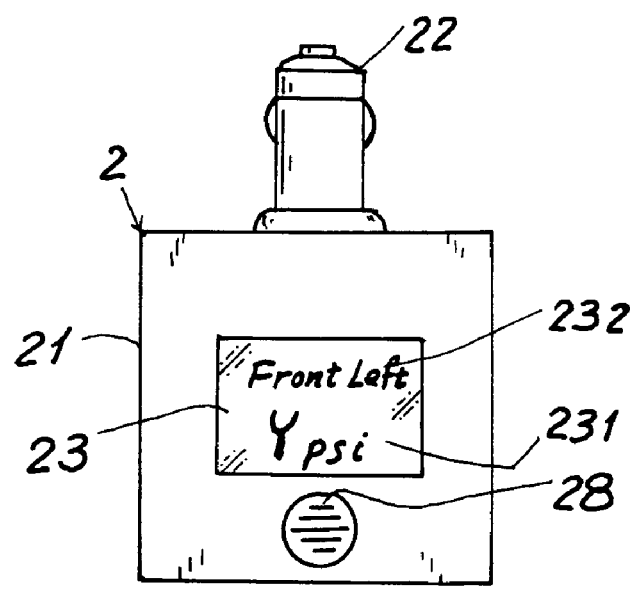
FIG. 6 shows another example of this invention.

As shown in FIG. 6, another preferred embodiment of the present invention is formed by simplifying the embodiment of the receiver 2 to include: a display 23 which can be turned on or lit up for a visual alarm when detects a car wheel causing low tire pressure and will show the tire pressure data (231) of this car wheel and the location (232) of this car wheel, as selected from: the front left, the front right, the rear left and the rear right position. Also, the buzzer 28 is provided for sounding an audio alarm for the low-pressure car wheel.

I claim:

1. A wireless tire pressure alarming system comprising:
a plurality of tire pressure transmitters each attached to each car wheel for sensing a tire pressure in each wheel tire and operatively transmitting a tire pressure signal remotely upon sensing a low tire pressure below a predetermined safety pressure value; and
a tire pressure receiver formed in a car and connected with a plurality of alarms each alarm corresponding to one car wheel among all car wheels, whereby upon receiving of a low tire pressure signal sent from one said transmitter corresponding to one said car wheel causing low tire pressure, said receiver will actuate one said alarm corresponding to said car wheel having low tire pressure for warning a car driver for enhancing his or her driving safety;
the improvement which comprises:
said receiver including a plug plugged in a car cigarette-lighter receptacle for powering said receiver for operatively receiving the signal as sent from said transmitter; said receiver including: a receiver body; said plug protruding forwardly from the receiver body and operatively plugged in said car cigarette-lighter receptacle when removing the cigarette lighter from the receptacle for connecting power supply from a car battery through the receptacle; four LEDs respectively disposed on a front left portion, a front right portion, a rear left portion and a rear right portion corresponding to four car wheels respectively disposed on four portions of the car for optically warning the car wheel causing low tire pressure; a buzzer formed on said receiver body for sounding an audio alarm for the car wheel having low tire pressure; and a plurality of selectors each operatively selecting an identification code of one said transmitter attached to one said car wheel to which said transmitter is attached.

2. A wireless tire pressure alarming system comprising:
a plurality of tire pressure transmitters each attached to each car wheel for sensing a tire pressure in each wheel tire and operatively transmitting a tire pressure signal remotely upon sensing a low tire pressure below a predetermined safety pressure value; and
a tire pressure receiver formed in a car and connected with a plurality of alarms each alarm corresponding to one car wheel among all car wheels, whereby upon receiving of a low tire pressure signal sent from one said transmitter corresponding to one said car wheel causing low tire pressure, said receiver will actuate one said alarm corresponding to said car wheel having low tire pressure for warning a car driver for enhancing his or her driving safety;
the improvement which comprises:
said receiver including a plug plugged in a car cigarette-lighter receptacle for powering said receiver for operatively receiving the signal as sent from said transmitter; said receiver formed as a car-shaped body having the plurality of alarms formed on a plurality of positions on the car-shaped body of the receiver, in which each position of each said alarm on said car-shaped body is corresponding to each position of each car-wheel positioned on a real car.

3. A wireless tire pressure alarming system comprising:
a plurality of tire pressure transmitters each attached to each car wheel for sensing a tire pressure in each wheel tire and operatively transmitting a tire pressure signal remotely upon sensing a low tire pressure below a predetermined safety pressure value; and a tire pressure receiver formed in a car and connected with a plurality of alarms each alarm corresponding to one car wheel among all car wheels, whereby upon receiving of a low tire pressure signal sent from one said transmitter corresponding to one said car wheel causing low tire pressure, said receiver will actuate one said alarm corresponding to said car wheel having low tire pressure for warning a car driver for enhancing his or her driving safety;

the improvement which comprises:

said receiver including a plug plugged in a car cigarette-lighter receptacle for powering said receiver for operatively receiving the signal as sent from said transmitter; said receiver including: a receiver body; said plug protruding forwardly from the receiver body and operatively plugged in said car cigarette-lighter receptacle when removing the cigarette lighter from the receptacle for connecting power supply from a car battery through the receptacle; a display formed on said receiver body operatively turned on to show a tire pressure data when one said car wheel causing low tire pressure and operatively showing a position of the car wheel having low tire pressure as selected from four positions respectively disposed on a front left portion, a front right portion, a rear left portion and a rear right portion of the car corresponding to the four car wheels respectively; and a buzzer formed on said receiver body for sounding an audio alarm for the car wheel having low tire pressure.

* * * * *